Figure 4:
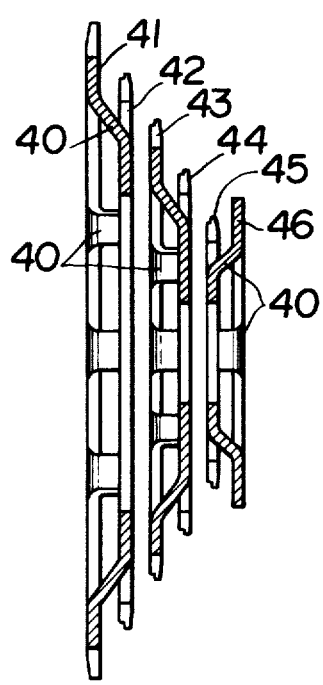

United States Patent [19]

Shimano

[11] 4,380,445
[45] Apr. 19, 1983

[54] TRANSMISSION FOR A BICYCLE

[75] Inventor: Keizo Shimano, Sakai, Japan

[73] Assignee: Shimano Industrial Company Limited, Osaka, Japan

[21] Appl. No.: 601,652

[22] Filed: Aug. 4, 1975

[30] Foreign Application Priority Data

Aug. 16, 1974 [JP] Japan .................. 49-94477
Aug. 16, 1974 [JP] Japan .................. 49-94478

[51] Int. Cl.³ .................................... F16P 1/00
[52] U.S. Cl. ........................... 474/144; 474/160
[58] Field of Search ............ 74/243 R, 217 G, 240, 74/611, 594.2, 594.1, 439; 29/159 R, 159.2; 113/116 D; 72/325, 326; 474/144, 160, 158

[56] References Cited

U.S. PATENT DOCUMENTS

| | | | |
|---|---|---|---|
| 877,820 | 1/1908 | Badger | 74/243 R |
| 3,477,303 | 11/1967 | Brilando | 74/243 |
| 3,477,303 | 11/1967 | Brilando | 74/243 |
| 3,550,465 | 12/1970 | Maeda | 74/240 |
| 3,835,729 | 9/1974 | Tawutani | 74/611 |
| 4,044,621 | 8/1977 | McGregor, Sr. et al. | 74/243 R |
| 4,106,357 | 8/1978 | Segawa | 474/160 |

FOREIGN PATENT DOCUMENTS

| | | | |
|---|---|---|---|
| 858937 | 10/1952 | Fed. Rep. of Germany | 74/160 |
| 321424 | 5/1902 | France | 74/160 |
| 910326 | 6/1946 | France | 74/243 |
| 2219709 | 9/1974 | France | 74/144 |
| 44-16043 | 1/1966 | Japan | 74/160 |
| 50-41244 | 4/1975 | Japan | 74/144 |
| 629557 | 9/1949 | United Kingdom | 74/144 |
| 641308 | 8/1950 | United Kingdom | 74/160 |
| 704207 | 2/1954 | United Kingdom | 74/160 |
| 921614 | 3/1963 | United Kingdom | 74/160 |

*Primary Examiner*—Samuel Scott
*Assistant Examiner*—G. Anderson
*Attorney, Agent, or Firm*—Stevens, Davis, Miller & Mosher

[57] ABSTRACT

A transmission for multi-speed freewheels or a multi-speed gear system of a bicycle, which comprises two or more sprockets or the sprockets and a chain guard, formed by punching a metallic plate member; at the same time, a plurality of connectors are formed integrally with the sprockets and chain guard so that the sprockets or those and the chain guard may be regularly spaced with the connectors respectively in the relationship that the members are adjacent each other.

13 Claims, 8 Drawing Figures

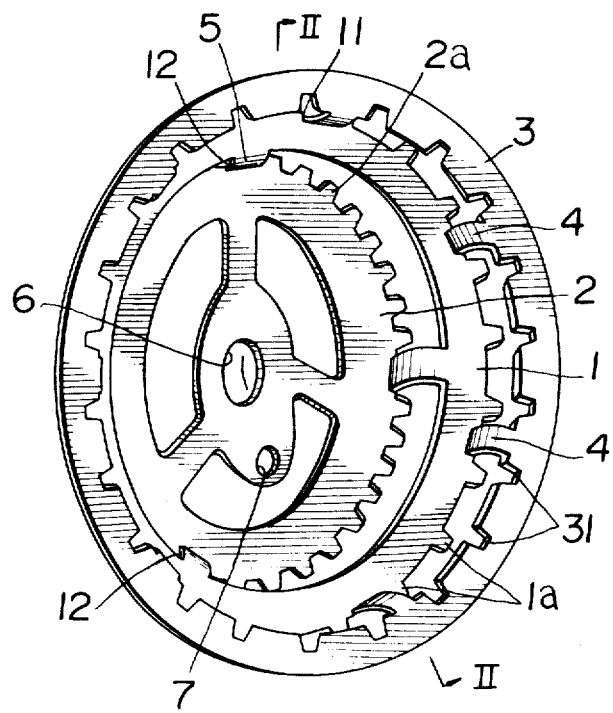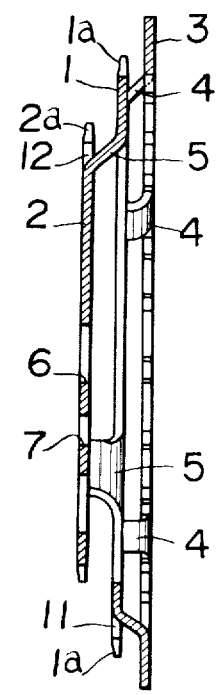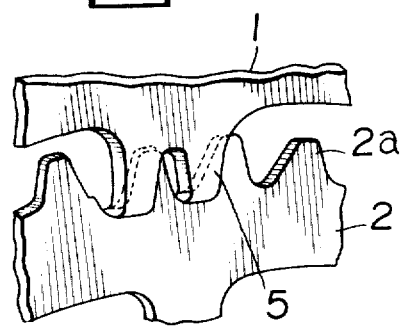

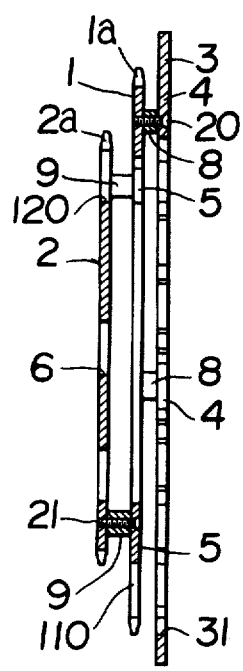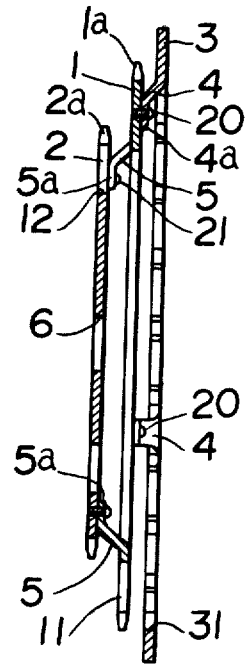

TRANSMISSION FOR A BICYCLE

This invention relates to a transmission for a bicycle and more particularly to a transmission which serves as a front gear system mounted to a pedal crank arm, or as freewheels at a rear hub so as to be meshed with a drive chain for transmitting the drive force from pedalling to the rear wheel of the bicycle.

Conventionally, multi-speed freewheels or a multi-speed front gear system, composed of a plurality of sprockets in combination, or a transmission comprising sprockets and a chain guard at one side thereof, are so formed that such sprockets and chain guard are separately formed and then connected with each other by means of mounting pieces, spacers and mounting screw bolts or the like.

Accordingly, the foresaid assembly for a bicycle has had defects including requiring a complicated manufacturing process, reduced efficiency in production, and expensive manufacturing cost leading to the impracticability of mass-production, and problems in stocking parts used for the assembly. Furthermore, use of mounting pieces, spacers and screw bolts has made the assembly complicated in construction and heavier in weight.

This invention has been designed to eliminate the foregoing defects. A main object of the invention is to provide a transmission for a bicycle, which requires no assembly of separate sprockets and a chain guard so that the transmission may be produced in a simple process resulting in sharply reducing the manufacturing cost. Another object of the invention is to provide a transmission of a bicycle, which requires no conventional mounting pieces, spacers and mounting screw bolts for assembling a plurality of sprockets, or at least one sprocket and a chain guard, so that the transmission may as a whole be made light and strong.

A further object of the invention is to provide a transmission for a bicycle, in which one can readily renew a worn sprocket or chain guard.

Figure 5:
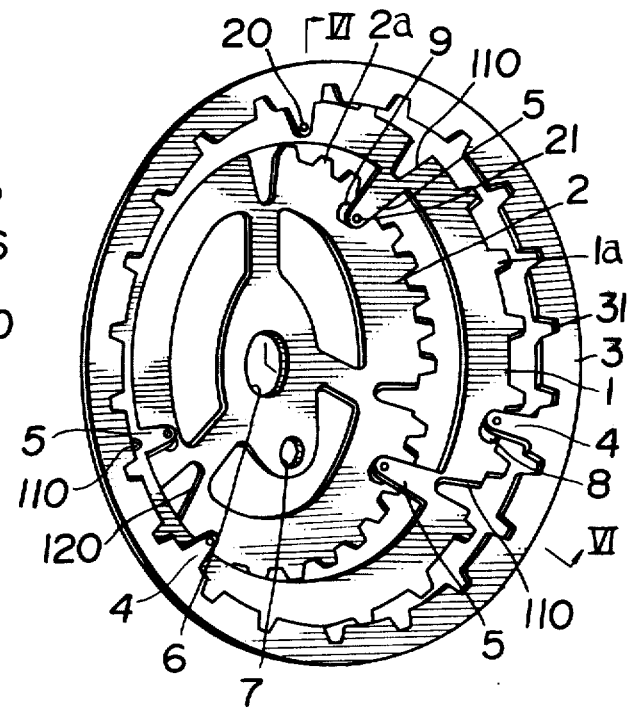
Figure 8:
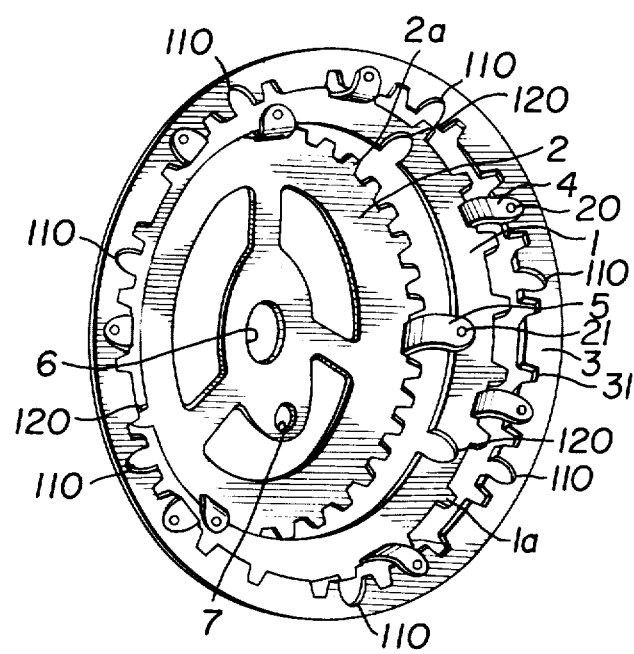

The aforementioned objects of the invention and others will be apparent from the following description of an embodiment in accordance with the accompanying drawings, in which:

FIGS. 1 through 3 showing a transmission of the invention applied to a front gear system of a bicycle, FIG. 1 is a perspective view thereof, FIG. 2 is a sectional view taken on line II—II in FIG. 1, FIG. 3 is a partially enlarged view of connectors in a modified embodiment at the base thereof, FIG. 4 is a longitudinal section of an embodiment of the transmission of the invention, applied to multi-speed freewheels, and FIGS. 5 through 7 showing an embodiment which is a modification of the transmission in FIGS. 1 through 4, and FIGS. 5 and 6 show the same applied to a front gear system, FIG. 5 is a perspective view thereof, FIG. 6 is a section taken on line VI—VI in FIG. 5, FIG. 7 is a longitudinal section showing another modified embodiment corresponding to the transmission in FIG. 6, and FIG. 8 is a perspective view of yet another embodiment.

A front gear system of a bicycle is shown in FIGS. 1 and 2, which comprises two differentially dented sprockets 1 and 2 and a chain guard 3. A major sprocket 1 and a minor sprocket 2 and a chain guard 3 are formed integrally with each other by punching a flat metallic plate member.

The metallic plate material previously formed in a disc-like shape as large as the chain guard 3, the largest member or of the dimensions necessary for a plurality of the members, is punched to be formed as aforesaid. In this formation, the major sprocket 1 and the chain guard 3 except the minor sprocket 2, are formed in a ring-like shape respectively; at the same time, the largest diameter chain guard 3 is, as indicated with the reference numeral 31 in FIG. 1, cut at the inner peripheral portion of the annular body thereof so as to form dents 1a in the major sprocket 1, and across the inner periphery of the chain guard 3 and the outer periphery of the major sprocket 1 are formed a plurality of connectors 4 each of a given width so that the sprocket 1 and the chain guard 3 are united through the connectors. In this instance, if the chain guard 3 has the inner diameter equal to or slightly larger than the outer diameter of the major sprocket 1, it is unnecessary to form the dents 1a by cutting the chain guard 3 as aforesaid. When the minor sprocket 2 has the outer diameter equal to or less than the inner diameter of the major sprocket 1, the dents 2a of the minor sprocket 2 are formed radially inwardly from the inner periphery of the major sprocket 1, while, when larger, the dents 2a are, as the same as the aforesaid, formed when cutting the inner peripheral portion of the sprocket 1. Also, between the outer periphery of the minor sprocket 2 and the inner periphery of the major sprocket 1 are formed a plurality of connectors 5, the same as aforesaid, so that the minor sprocket 2 and the major sprocket 1 may be integrally connected with each other through the connectors 5.

The aforesaid connectors 4 and 5 between the chain guard 3, the major sprocket 1 and the minor sprocket 2 respectively, are formed in place of one to three dents at the sprockets 1 and 2 respectively, where the thus neglected dents at each of the sprockets 1 and 2 do not have any unfavourable effect upon the mesh of the sprockets with a drive chain (not shown) of the bicycle. Incidentally, without the neglect of the dents as aforesaid, the connectors may be, as shown in FIG. 3, formed in a manner that they are extended from the adjacent intervals at both sides of one dent.

In this instance, being obliged to be reduced in width, the connectors may be lowered in strength, but, if necessary, they are increased in number so as to make them secure. When the dents 1a at the major sprocket 1 are, as shown in the drawings, formed by alternately omitting one dent, the connectors 4 may be extended from between adjacent dents. The connectors 4 and 5 are made so long that the chain guard 3, the major sprocket 1 and the minor sprocket 2, may be kept in a given spaced interval therebetween respectively, and that the drive chain in mesh with the major or the minor sprocket may not be intercepted by the connectors. To secure such proper lengths of the connectors 4, the major sprocket 1 is radially inwardly cut as indicated with the reference numeral 11 in FIG. 1, to an extent that the connectors 4 may be based at one end thereof at a substantially radially widthwise intermediate portion of the annular body of the sprocket 1, while connectors 5 have the proper length as aforesaid when the outer periphery of the minor sprocket 2 and the inner periphery of the major sprocket 1 are spaced enough to get the length. When the aforesaid space is too small to get the proper lengths, the minor sprocket 2 is, as indicated with the reference numeral 12 in FIG. 1, cut to form the connectors 5 in proper lengths, the same as the aforesaid connectors 4.

The metallic plate formed by punching, includes the sprockets 1 and 2 and chain guard 3, all flush with each other, from which plate the chain guard 3 and the sprockets 1 and 2 are axially displaced by bending the connectors so as to be kept in a given spaced interval through the bent connectors 4 and 5 respectively. Incidentally, the displacement of the same is available concurrently at the formation or at a following separate process.

In the aforesaid displacement of the members, the connectors 4 and 5 should be bent to the extent that they cause no interception to the drive chain in mesh with each of the sprockets 1 and 2 and that the chain guard 3, and the sprockets 1 and 2 are held in a given spaced interval therebetween respectively, where the connectors may be bent in either a slant or curvature.

Referring to FIGS. 1 and 2, the reference numeral 6 denotes an axle hole at the center of the minor sprocket 2, and 7 denotes a hole for retaining the transmission to a crank arm (not shown) of the bicycle.

The aforesaid embodiment of the invention indicates a two-speed front gear system provided with the chain guard 3, but there are others with no chain guard. A gear system of only one sprocket and a chain guard is available to obtain the same effect as aforesaid.

The construction of the invention is similarly applicable to sprockets for multi-speed freewheels other than the aforesaid front gear system. In FIG. 4 are shown five-speed transmission freewheels having five sprockets 41 through 45 inclusive and a chain guard 46, which are assembled in three pairs from the major sprocket 41 to the minor sprocket 45 and the chain guard 46 of a larger diameter than that of the sprocket 45, namely, in order from the low speed to the high speed stage. Incidentally, the assembly may be two sets of three members, or extremely one set of five members. In addition, in FIG. 4 the reference number 40 denotes connectors of each pair of members.

The abovementioned embodiment includes the connectors 4 and 5, which are integrally formed across the inner periphery of the chain guard 3 and the outer periphery of the major sprocket 1 and across the inner periphery of the latter and the outer periphery of the minor sprocket 2 respectively. However, the connectors may be formed as shown in FIGS. 5 and 6, in which drawings each one end of the connectors 4 in the outwardly radial direction of the sprocket, is integrally formed with the inner peripheral portion of the chain guard 3, and each other end of the same in the inwardly radial direction of the sprocket, is formed by cutting the outer peripheral portion of the major sprocket 1, and then is separated therefrom. Next, the connectors 4 are allowed to be displaced together with the chain guard 3 in the circumferential direction thereof from cutouts 110, remainders of the inner ends of the connectors, at the major sprocket 1, and fixed thereto by means of fixing means, such as screw bolts or the like. The connectors 5 are, in the same manner as the formation of the connectors 4, integrated at each one end thereof with the inner peripheral portion of the major sprocket 1, formed at each other end thereof by cutting out the outer peripheral portion of the minor sprocket 2 in place of the dents 2a thereof, and then circumferentially displaced from cutouts 120, remainders of the other ends, being fixed with fixing means 21, such as screw bolts or the like. Thus, the chain guard 3 and the major and the minor sprocket 1 and 2, are integrally connected adjacently to each other by means of the connectors 4 and 5 respectively.

The connectors 4 integrated at one end thereof with the chain guard 3 respectively, are formed at the other end thereof by cutting the outer peripheral portion of the major sprocket 1 in place of one through three dents thereof, or between adjacent dents when the sprocket 1 has dents alternately ommitted, and the cutting is located in alignment with the connector 5 formed at the major sprocket 1 respectively.

The connectors 5 at the major sprocket 1 are formed in each given length by cutting out the outer peripheral portion of the annular body of the minor sprocket 2 in place of one through three dents 2a thereof, in alignment with supporting arms 6 at the minor sprocket 2. In this instance, even the sprockets 1 and 2 are lack in two or three dents 1a and 2a respectively, there is not any influence upon the engagement of the same with the drive chain (not shown).

The aforesaid connectors 4 and 5 are so long that the inward idle ends thereof reach or exceed substantially half the width of the annular body of the sprockets 1 which is smaller than the chain guard 3 and of the sprocket 2 which is smaller than sprocket 1 respectively when these three members are coaxially placed. Namely, when the sprockets 1 and 2 and the chain guard 3 are connected with the connectors 4 and 5 through spacers 8 and 9 as shown in FIGS. 5 and 6, the connectors are elongated enough to reach half the width of the annular bodies of sprockets 1 and 2 respectively, on the other hand, when connected not through the spacers 8 and 9 but directly with junctures 4a and 5a which are, as shown in FIG. 7, formed of bent idle ends of the connectors so as to reach substantially middle portions of the annular bodies of the sprockets 1 and 2 respectively, the connectors should be elongated with addition of the bent portions thereof.

In addition, the aforesaid connectors 4 and 5 are radially inwardly extending from the inner periphery of the larger diameter members respectively, but the same may be formed in extension radially outwardly of the outer periphery of the smaller diameter members (FIG. 8) or may be formed extending oppositely of the adjacent members and connected at the opposite ends thereof between both the members.

The connectors may be fixed to the adjacent members in welding other than with screw bolts 20 and 21 as aforesaid. However, in the latter case, there are such advantages as readily renewing a worn sprocket by unscrewing the bolts.

As is clearly understood from the aforesaid description, the transmission of the invention are composed of a plurality of sprockets or of at least one sprocket and a chain guard, which are integrally formed from one metallic plate member so that the assembly thereof may be carried out in a simple process not a complicated that in a conventional transmission.

Accordingly, the transmission of the invention is adaptable to be mass-produced, sharply reduced in the manufacturing cost and inexpensive to produce, furthermore, no use of spacers and mounting screw bolts can neglect the supervision of such parts and also make the transmission light and strong.

Furthermore, the transmission includes the sprockets and the chain guard connected through connectors integrally formed therewith so that when worn, each of the sprockets and chain guard may be readily renewed while having the aforesaid advantages.

While there has been described a preferred form of the invention, obviously modifications and various are possible in light of the above teaching. It is therefore to be understood that within the scope of the appended claims the invention may be practiced otherwith than as specially described.

What is claimed is:

1. A compound sprocket structure particularly advantageous for use in a bicycle or other vehicle comprising a single plate structure including at least two plate segments each of which has a peripheral edge formed to include a set of teeth, one of said plate segments being offset from the other to provide that said plate segments are arranged thereby to lie in adjacent substantially parallel planes, one of said plate segments being rimmed by and lying within the boundary of the other and the outer of said plate segments having an annular shape, and strip-like plate portions providing connector means joining the respective plate segments, as a continuing part thereof, to rigidly maintain said plate segments in their respective offset substantially parallel planes.

2. A compound sprocket structure particularly advantageous for use in a bicycle or other vehicle comprising at least two plate segments each of which has a peripheral edge formed to include a set of teeth, one of said plate segments being offset from the other to provide that said plate segments are arranged thereby to lie in adjacent substantially parallel planes, one of said plate segments being rimmed by and lying within the boundary of the other and the outer of said plate segments having an annular shape, and connector means joining said plate segments and forming a continuation of the plate form thereof, said structure having the appearance of a plate having a dished configuration, the central portion and base of said dish being provided by said one plate segment, which has a disc-like shape.

3. A sprocket structure as in claim 2 characterized by the outer peripheral edge of said disc-like portion of said plate embodying therein a series of circularly spaced notches, at the base of at least a portion of which notches said disc-like portion of said plate has joined thereto and extended radially outward therefrom strip portions of said plate which are offset and connected at their radial outermost ends in an integrated relation to the inner edge of the outer one said plate segments to provide said connector means and maintain said outer one of said plate segments in a rigidly connected, concentric and relatively fixed relation to said disc-like portion of said plate.

4. A sprocket structure particularly advantageous for use in a bicycle or other vehicle comprising a plate formed to include therein a plurality of concentric plate portions which are relatively displaced to occupy offset substantially parallel planes, said plate having a dished configuration, the base of said dish being formed by a central portion thereof which has a disc-like shape, said central dished portion being relatively flat and the peripheral edge thereof being formed to include thereon a set of circularly spaced outwardly projected sprocket teeth, the outer peripheral edge of said disc-like portion of said plate embodying therein a series of circularly spaced notches, at the base of at least a portion of which notches said disc-like portion of said plate has joined thereto and extended radially outward therefrom strip-like portions of said plate which are offset and connected at their radial outermost ends in an integrated relation to an outer one of said concentric plate portions to maintain said outer one of said concentric plate portions in a rigidly connected and respectively fixed relation to said disc-like portion of said plate and said disc-like portion of said plate including, in integral connection therewith, means for mounting a guard to said sprocket structure without need for conventional fasteners.

5. A sprocket structure comprising a single plate formed as a stamping from sheet material wherein a central portion thereof is dished relative to an outer peripheral portion and each said portion is formed to include a set of circularly spaced outwardly projected sprocket teeth and portions of said plate intermediate said central portion and said outer peripheral portion being formed as a web to maintain said central portion and said outer peripheral portion in substantially parallel planes.

6. Apparatus as set forth in claim 5 characterized in that said central portion of said plate includes, in integral connection therewith, means for mounting a guard to said sprocket structure without need for conventional fasteners.

7. A sprocket structure as in claim 5 characterized in that said outer peripheral portion of said plate has an annular configuration and embodies the teeth in connection therewith on its outer periphery and said central portion of said plate is a plate segment of disc-like shape incorporating the teeth in connection therewith in a manner that they project from its outer periphery in a circularly spaced relation and said web which interconnects said central and said outer peripheral portions of said plate is comprised of a plurality of relatively narrow bands of sheet material from which said plate is formed, said bands being smoothly bent to provide for the offset of one of said central and outer peripheral plate portions from the other.

8. A sprocket structure as in claim 7 characterized in that said narrow bands forming said web are radially oriented and circularly spaced about the periphery of said central portion of said plate and intermediate the successively adjacent of said bands said central portion of said plate embodies, in each case, a plurality of projected sprocket teeth.

9. A sprocket structure comprising at least two sprockets and a plurality of strip-like connectors interconnecting said sprockets and defining a given interval between them, one of said sprockets being larger in diameter than the other sprocket, said larger diameter sprocket being ring-like shaped and having a larger inner diameter than a diameter at the bottom of the teeth of said smaller diameter sprocket, said smaller diameter sprocket having at the center thereof an axial bore, each of said connectors extending radially of said sprockets and at one end thereof forming a continuing part of one of an inner periphery of said larger diameter sprocket and an outer periphery of said smaller diameter sprocket, each of said connectors at the other end thereof extending over a portion of the other of said larger diameter sprocket and smaller diameter sprocket and being fixed to one side surface thereof by fixing means.

10. A sprocket structure as in claim 9 wherein each of said connectors at one end forms a continuing part of an inner periphery of said larger diameter sprocket and at another end extends over the bottom of a tooth of said smaller diameter sprocket and is fixed by fixing means at an inner face thereof to one side surface of said smaller diameter sprocket.

11. A sprocket structure as in claim 9 wherein said smaller diameter sprocket has peripheral teeth and each of said connectors at one end forms a continuing part of said smaller diameter sprocket at the bottom of said peripheral teeth, each said connector extending over the inner periphery of said larger diameter sprocket and being fixed at an outer face of another end to the outer side surface of said larger diameter sprocket by fixing means.

12. A sprocket structure comprising at least two plate segments, one formed as a sprocket having peripheral teeth and the other formed as a chain guard larger in diameter than said sprocket, and a plurality of strip-like connectors for interconnecting said sprocket and chain guard plate segments and defining a given spaced interval between them, said chain guard having a ring-like shape and an inner diameter larger than a diameter at the bottom of the teeth of said sprocket, each of said connectors extending radially of said sprocket and chain guard and forming an intergral continuing part of said sprocket and chain guard whereby said sprocket and chain guard form a one-piece assembly.

13. A sprocket structure comprising at least two plate segments, one formed as a sprocket having peripheral teeth and the other formed as a chain guard larger in diameter than said sprocket, and a plurality of strip-like connectors for interconnecting said sprocket and chain guard plate segments and defining a given spaced interval between them, said chain guard having a ring-like shape and an inner diameter larger than a diameter at the bottom of the teeth of said sprocket, each of said connectors extending radially of said sprocket and chain guard and at one end thereof forming an integral continuing part of one of said sprocket and chain guard at the other end thereof being connected to the other of said sprocket and chain guard through fixing means.

* * * * *